US010006773B2

(12) United States Patent
Isert et al.

(10) Patent No.: US 10,006,773 B2
(45) Date of Patent: Jun. 26, 2018

(54) PROCESS FOR OPERATING A ROUTE ACQUISITION SYSTEM AND A ROUTE ACQUISITION SYSTEM

(75) Inventors: Carsten Isert, Munich (DE); Andreas Winckler, Mountain View, CA (US)

(73) Assignee: Bayerische Motoren Werke Aktiengesellschaft, Munich (GE)

( * ) Notice: Subject to any disclaimer, the term of this patent is extended or adjusted under 35 U.S.C. 154(b) by 1389 days.

(21) Appl. No.: 13/368,896

(22) Filed: Feb. 8, 2012

(65) Prior Publication Data
US 2012/0209511 A1 Aug. 16, 2012

(30) Foreign Application Priority Data
Feb. 10, 2011 (DE) .................. 10 2011 003 914

(51) Int. Cl.
*G01C 21/34* (2006.01)
*G01C 21/32* (2006.01)

(52) U.S. Cl.
CPC ................................. *G01C 21/32* (2013.01)

(58) Field of Classification Search
CPC ............ G01C 21/3492; G01C 21/3423; G01C 21/3446; G01C 21/3469; G01C 21/3632; G01C 21/26; H04L 29/06; H04L 69/329
USPC ........ 701/117, 120, 411, 431, 533; 715/733; 340/990; 370/392; 342/457; 358/1.15; 345/173
See application file for complete search history.

(56) References Cited

U.S. PATENT DOCUMENTS

| 5,486,822 | A | * | 1/1996 | Tenmoku | G01C 21/3446 340/990 |
| 6,470,012 | B2 | * | 10/2002 | Nakatsugawa | H04J 3/22 370/392 |
| 6,587,127 | B1 | * | 7/2003 | Leeke | G06Q 20/123 715/733 |
| 6,591,188 | B1 | | 7/2003 | Ohler | |
| 2001/0002456 | A1 | | 5/2001 | Ikeuchi et al. | |

(Continued)

FOREIGN PATENT DOCUMENTS

| DE | 100 59 145 A1 | 6/2001 |
| DE | 60 2004 002 047 T2 | 2/2007 |
| DE | 10 2007 062 991 B3 | 5/2009 |

OTHER PUBLICATIONS

German Search Report dated Jun. 7, 2011 with partial English translation (ten (10) pages).

*Primary Examiner* — Anne M Antonucci
*Assistant Examiner* — Sanjeev Malhotra
(74) *Attorney, Agent, or Firm* — Crowell & Moring LLP

(57) ABSTRACT

A process is provided for operating a route acquisition system, configured for determining route data during movement of the route acquisition system along preset routes, and for storing the latter as electronic routes in the data memory. A preset selection of routes is determined as a function of the stored electronic routes. For each route of the preset selection, a route count and a route point in time, and a first and a second route time indication, are determined. A route evaluation is determined for each route based on the assigned route count, the assigned route point in time, and the first and second route time indication. As a function of a determined size of the occupied storage space of the data memory, the respective route of the preset selection is deleted from the data memory as a function of its assigned route evaluation.

14 Claims, 3 Drawing Sheets

(56) References Cited

U.S. PATENT DOCUMENTS

| | | | |
|---|---|---|---|
| 2002/0120392 A1* | 8/2002 | Stratton | B64F 1/002 701/120 |
| 2003/0169203 A1* | 9/2003 | Franckart | G01S 5/02 342/457 |
| 2005/0027436 A1 | 2/2005 | Yoshikawa et al. | |
| 2006/0161337 A1* | 7/2006 | Ng | G01C 21/3423 701/533 |
| 2008/0065324 A1* | 3/2008 | Muramatsu | G08G 1/123 701/533 |
| 2009/0002759 A1* | 1/2009 | Fujii | H04W 8/24 358/1.15 |
| 2009/0037086 A1* | 2/2009 | Kolb | G01C 21/3492 701/117 |
| 2009/0164505 A1 | 6/2009 | Tudose | |
| 2010/0292924 A1* | 11/2010 | Kato | G01C 21/3632 701/431 |
| 2011/0128248 A1* | 6/2011 | Nakata | G01C 21/26 345/173 |
| 2012/0041671 A1* | 2/2012 | Miura | G01C 21/3469 701/411 |

* cited by examiner

PROCESS FOR OPERATING A ROUTE ACQUISITION SYSTEM AND A ROUTE ACQUISITION SYSTEM

CROSS-REFERENCE TO RELATED APPLICATION

This application claims priority under 35 U.S.C. § 119 from German Patent Application No. DE 10 2011 003 914.7, filed Feb. 10, 2012, the entire disclosure of which is herein expressly incorporated by reference.

BACKGROUND AND SUMMARY OF THE INVENTION

The invention relates to a process for operating a route acquisition system and to a route acquisition system.

A route acquisition system may be included, for example, in a navigation system in a motor vehicle and has, for example, a route acquisition unit, such as a GPS unit. By means of the route acquisition unit, route data of the navigation system can be determined along a driven route of the motor vehicle in the form of electronic routes.

It is an object of the invention to provide a process for operating a route acquisition system as well as a route acquisition system which permits an efficient and reliable storage of electronic routes.

According to a first and second aspect, the invention is characterized by a process for operating a route acquisition system and by a corresponding route acquisition system which comprises a route acquisition unit and a data memory. The route acquisition system is constructed for determining, by means of the route acquisition unit, route data during a movement of the route acquisition system along preset routes and for storing the latter in the form of electronic routes in the data memory. In this case, a preset selection of routes is determined during a preset first operation of the route acquisition system as a function of the electronic routes stored in the data memory. Furthermore, during the first operation, for each route of the preset selection, a number of essentially coinciding routes from the preset selection is determined. In addition, for each route of the preset selection, a route point in time is determined which is representative of a point in time at which the route acquisition system was moved along the preset route. Then a first route time indication relative to a first time unit is determined as a function of the route point in time, and a second route time indication relative to a second time unit is determined as a function of the route point in time. Furthermore, during the first operation, a route evaluation is determined for each route of the preset selection as a function of the assigned number of routes and the assigned route pointing time and the assigned first and second route time indication. Each route of the preset selection is marked with the assigned determined route evaluation. During a preset second operation of the route acquisition system, a size of an occupied storage space of the data memory is determined. As a function of the determined size of the occupied storage space, the respective route of the preset selection is deleted from the data memory as a function of its assigned route evaluation.

This permits a particularly efficient and reliable storage of electronic routes because, as a result of the route deletion, the corresponding electronic routes, in particular, the electronic routes which are evaluated as not necessary, are deleted from the data memory, and therefore sufficient free storage space will exist for new routes to be stored.

In this case, a route typically represents a path between several geographical points. The electronic route is preferably represented by several linked segments or links and is stored in this form in the data memory. In this case, a segment or link represents a route section which differs at least with respect to one preset characteristic from the characteristics of a preceding or following route section; for example, with respect to an obligatory speed, a direction, a road category, such as a federal highway or expressway, etc. The segments of an electronic route are represented, for example, by the route data of the electronic route. The route acquisition system is, for example, arranged in a motor vehicle and is preferably constructed for determining, for each driven route of the motor vehicle, the corresponding route data, as, for example, the form of the segments, and to store this driven route in the form of the corresponding electronic route in the data memory.

The data memory preferably comprises a data bank, in which the electronic routes are stored. With each acquired route, preferably a corresponding electronic route is determined by means of the route acquisition system and is stored in the data memory.

The preset first operation preferably is a normal operation of the route acquisition system, in which the latter is constructed for determining by means of the position indicating unit the electronic route corresponding to the driven route and storing it in the data memory. The preset second operation preferably represents a shutting-down of the route acquisition system before its switch-off. During the shutting-down, the electronic route corresponding to the driven route typically can no longer be determined and stored by means of the route acquisition system.

The essentially coinciding routes each represent a group of routes or a so-called "route cluster". In this case, the routes assigned to the respective route cluster may deviate from one another within a preset framework. The routes assigned to the electronic routes in the route cluster, along which the route acquisition system was moved in each case, preferably correspond to one another. Thus, for example, the routes of the respective route cluster can be determined to be coinciding if at least one preset quantity of the route data assigned to the routes coincide; thus, for example, if a preset number of segments coincide. A conformity can also be determined if a preset quantity of route data assigned to the routes correspond to one another, taking into account the lengths of the routes.

The determined route point in time of the respective electronic route preferably represents a value of a time stamp, which is stored in a preset format in the data memory, as, for example, in a Unix time format. The respective time stamp is preferably assigned to the first segment of the respective electronic route and represents a point in time at which the route acquisition system was moved along a first route section corresponding with the first segment. The first route time indication preferably represents a time indication relative to the first time unit, which is determined from the assigned route point in time. The second route time indication preferably represents a time indication relative to the second time unit which is determined from the assigned route point in time and differs from the first. For example, the first route time indication represents the minute of the day at which the position acquisition system was moved along the first segment. For example, the second route time indication represents the day of the week on which the position acquisition system was moved along the first segment.

In an advantageous further development of the first and second aspect, the determined size of the occupied storage space is compared with a preset first occupancy level threshold value and with a second preset occupancy level threshold value. The respective route of the preset selection is deleted as a function of its assigned route evaluation if the determined size of the occupied storage space is larger than the preset first occupancy level threshold value and smaller than the preset second occupancy level threshold value. This comparison is carried out in the preset second operation of the route acquisition system, whereby it becomes possible that a deletion of the electronic routes, which are classified as no longer necessary by means of their route evaluation, is carried out only if the data memory is correspondingly occupied. The first and the second occupancy level value preferably represent different memory occupancy levels of the data memory, in which case, the first occupancy level threshold value typically represents a lower occupancy level of the data memory than the second occupancy level threshold value. Preferably, the respective route evaluation is compared with a preset evaluation threshold value and, as a function thereof, the respective route is deleted if the determined size of the occupied storage space is larger than the preset first occupancy level threshold value and smaller than the preset second occupancy level threshold value.

In a further advantageous development of the first and second aspect, routes of the preset selection will be deleted as a function of their assigned route evaluation until the size of the occupied storage space reaches or falls below a preset third occupancy level threshold value. The preset third occupancy level threshold value preferably represents an occupancy level of the data memory between the occupancy levels which are represented by the first and second occupancy level threshold value. The evaluation threshold value can preferably be changed correspondingly as long as the preset third occupancy level threshold value has not yet been reached or there has been a falling below the third occupancy level threshold value.

In a further advantageous development of the first and second aspect, a first evaluation value is determined for each route of the preset selection as a function of the assigned route point in time. In addition, as a function of the assigned route count, a second evaluation value is determined. As a function of the assigned first and second route time indication, a third evaluation value is determined. As a function of the first and second and third evaluation value, the route evaluation is determined. The route evaluation will then be assigned to the respective electronic route of the preset selection; in particular, it is stored with the latter in the data memory. Preferably, the first, second and third evaluation value are multiplied with one another and the resulting product is assigned to the respective route evaluation. The respective evaluation values may, in addition, also be weighted differently. Also, a preset weighting value may be assigned to each evaluation value. It may also preferably be preset that, the lower the respective route evaluation, the more a probability of a deletion of this assigned electronic route will rise.

In a further advantageous development of the first and second aspect, the assigned route point in time for each route of the preset selection is compared with several preset time ranges. In this case, a preset range assignment value is assigned to each time range. It will then be determined to which preset time range the route point in time is assigned. That range assignment value of the determined time range is assigned to the first evaluation value of the respective route. The route point in time represents the point in time at which the assigned electronic route was determined. The farther the route point in time is in the past, the older this electronic route will be. In this case, the range assignment values are assigned, for example, to the respective time range such that, with an increasing age of the respective electronic route, a decreasing range assignment value will be assigned to that first evaluation value. This means, the older the route, the lower the assigned first evaluation value of this route.

In a further advantageous development of the first and second aspect, for each route of the preset selection, the assigned number of routes is compared with a preset route count threshold value. When there is a falling below the route count threshold value, a preset first value is assigned to the second evaluation value of the route. Otherwise, a second value that is dependent on the assigned number of routes is assigned to the second evaluation value. The first value is preferably fixedly preset. The second value is preferably determined such that it is representative of a reciprocal value of the assigned number of routes. The first value preferably is greater than the second value determined as a function of the number of routes. Thus, with a rising number of routes, a decreasing second evaluation value is determined per route cluster. The respective second evaluation value is preferably assigned to each route of the respective route cluster.

In a further advantageous development of the first and the second aspect, route clusters of essentially coinciding routes are determined from the preset selection of electronic routes. From the respective route cluster, a most recent electronic route is determined which has the most recent route point in time. A preset third value is assigned to the third evaluation value of the most recent route. For each additional route of the respective route cluster, the first route time indication of the additional route is compared with the first route time indication of the most recent route, and the second route time indication of the additional route is compared with the second route time indication of the most recent route. As a function of the comparison, a degree of a time-related correspondence relative to the first and second route indication between the most recent route and the additional route is determined. As a function of the determined degree of the time-related correspondence, the third evaluation value is determined and assigned to the additional route.

A fixedly preset third value is assigned to the most recent route of the respective route cluster, which third value preferably represents a maximal value of the third evaluation values within the respective route cluster. The respective degree of the time-related conformity is preferably determined as a function of a first and a second coincidence value. The first coincidence value is determined as a function of a preset normal distribution relative to the first route time indication of the respective additional route. A first preset assignment value is preferably assigned to the second coincidence value in the case of a conformity of the second route time indication of the respective additional route with the second route time indication of the most recent route. The first preset assignment value may, for example, be a maximal value of the second assignment values. If the second route time indication of the respective additional route corresponds to the second route time indication of the most recent route in a preset category, as, for example, a weekday, a weekend day, a holiday, a second preset assignment value is assigned to the second coincidence value. Otherwise, a third preset assignment value is assigned to the second coincidence value. The third preset assignment value may, for example, be a minimal value of the second assignment values. The second assignment value preferably is smaller than the first and larger than the third predefined assignment value. Preferably, a decreasing third evaluation value results from an increasing time-related conformity relative to the first and second route time indication between the most recent route and the additional route.

In a further advantageous development of the first and second aspect, a route length is determined during the preset first operation of the route acquisition system for each route of the preset selection. The route evaluation is determined as a function of the determined route length. This means that the route evaluation for each route of the preset selection is determined as a function of the assigned number of routes and the assigned route point in time and the assigned first and second route time indication and the assigned route length.

In a further advantageous development of the first and second aspect, a fourth evaluation value is determined for each route of the preset selection as a function of the assigned route length. The route evaluation is determined as a function of the fourth evaluation value; i.e., the route evaluation for each route of the given selection is determined as a function of the first, second, third and fourth evaluation value. The route evaluation is preferably determined as a product of these evaluation values. In this case, it may preferably be preset that, the lower the respective route evaluation, the more a probability of a deletion of this assigned electronic route will rise.

According to a third and fourth aspect, the invention is characterized by a process for operating a route acquisition system and by a corresponding route acquisition system which comprises a route acquisition unit and a data memory. The route acquisition system is constructed for, beginning from a respectively preset start position, acquiring route data by means of the route acquisition unit during a movement of the route acquisition system along a respectively provided route and storing these route data in the form of an electronic route in the data memory. Here, it is first determined whether the route detection system has reached a preset destination position. As a function of reaching the preset destination position, the route data are determined from the data memory, which were acquired during the movement of the route acquisition system. As a function of the preset start and destination position and the determined route data, a comparison route is determined as a function of the preset navigation data. Comparison route data of the determined comparison route are compared with the determined route data. As a function of the comparison, one or more determined route data are corrected.

This can make it possible to store the routes in a particularly efficient manner in the data memory. In this case, for example, superfluous route data can be deleted and/or faulty or missing route data can be replaced by the comparison route data.

Here, the route typically represents a path between several geographical points. The electronic route is preferably represented by several mutually linked segments or links and is stored in this form in the data memory. A segment or link represents a route section which differs at least with respect to one preset characteristic from the characteristics of a preceding or following route section; for example, with respect to an obligatory speed, a direction, a road category, such as a federal highway or expressway, etc. The segments of an electronic route are preferably represented by the route data of the electronic route. The route acquisition system is, for example, arranged in a motor vehicle and is preferably constructed for determining, for each driven route of the motor vehicle, the corresponding route data, as, for example, the form of the segments, and to store this driven route in the form of the corresponding electronic route in the data memory. Furthermore, the route acquisition system can, for example, also be used in portable navigation systems or smartphones.

The data memory preferably comprises a data bank in which the electronic data are stored. In addition, the preset navigation data can be stored in the data memory. Preferably, a corresponding electronic route is determined together with each acquired route by means of the route acquisition system and is stored in the data memory.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, elements of the same construction or function are provided with the same reference symbols in all figures.

Figure 1:
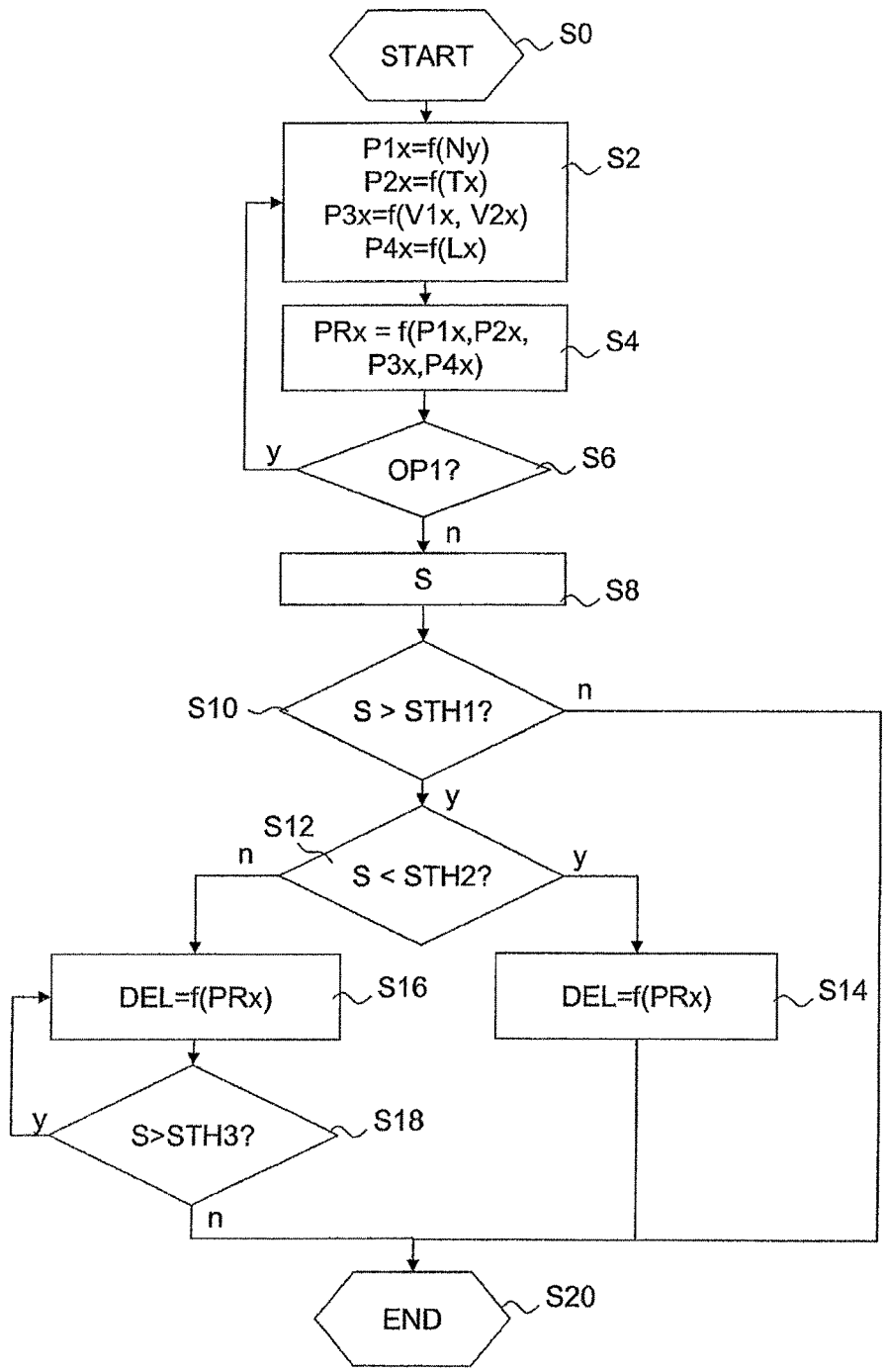
FIG. 1 is an exemplary flow chart executable by a program in a route acquisition system.

FIG. 1 illustrates a flow chart which is preferably executed by means of an implementation unit as a program in a route acquisition system. The program can be called a process for operating a route acquisition system and is preferably stored in a memory of the route acquisition system. The route acquisition system is included, for example, in a navigation system of a motor vehicle and has a route acquisition unit, such as a GPS unit and a data memory. By means of the route acquisition unit, route data of the navigation system can be determined along a driven route of the motor vehicle. These route data can then be stored in the form of an electronic route, which corresponds to the driven route of the motor vehicle, in the data memory of the route acquisition system.

The program is started in a Step S0. In a Step S2, a preset selection of routes is first determined as a function of the electronic routes stored in the data memory. Here, not every electronic route stored in the data memory has to be assigned to the preset selection. For each route x of the preset selection, a route count $N_y$ of essentially coinciding routes of the preset selection, a route point in time $T_x$, a first route time indication $V1_x$ and a second route time indication $V2_x$ are determined in Step S2.

Figure 2:
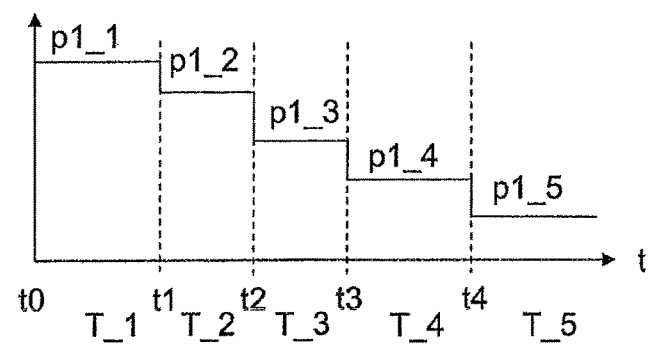
FIGS. 2 to 5 are diagramatic views.

The respective route point in time $R_x$ is representative of a point in time at which the route acquisition system was moved along the preset route. Preferably, the route point in time represents a time stamp which is assigned to a first route section of the route driven by means of the motor vehicle. A first evaluation value $P1_x$ is determined as a function of the routine point in time $T_x$. In this case, the route point in time $T_x$ is preferably compared with several preset time ranges $T\_1$-$T\_5$ (FIG. 2). A preset range assignment value $p1\_p1$-$p1\_5$ is assigned to each time range $T\_1$-$T\_5$. For example, a first range assignment value $p1\_1=1.0$ is assigned to a first time range $T\_1$ and extends, for example, between the route point of time $T_x$ and a first month. For example, a second time range assignment value p1_2=0.8 is assigned to a second time range T_2 and extends, for example, between the first month and a seventh month. For example, a third range assignment value p1_3=0.5 is assigned to a third time range T_3 and extends, for example, between the seventh and a ninth month. For example, a fourth range assignment value p1_4=0.3 is assigned to a fourth time range T_4 and extends, for example, between the ninth and a fourteenth month. Then, a fifth range assignment value of, for example, p1_5=0.1 is assigned. The range assignment value p1_1-p1_5 in whose time range the route point in time Tx falls is assigned to the first evaluation value P1x of the respective route.

Figure 3:
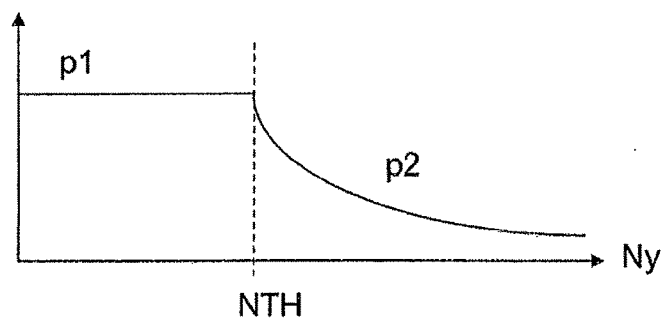

The route count Ny preferably represents the number of electronic routes of one route group respectively, which is also called a route cluster. In this case, each route x of the preset selection is typically assigned to a route cluster, in which case, the routes of the preset selection are distributed over y route clusters. The second evaluation value P2x is determined as a function of the route count Ny. For this purpose, the route count Ny of the respective route cluster is compared with a preset route count threshold value NTH, for example, 20 (FIG. 3). If the route count Ny falls below the preset route count threshold value NTH, a preset first value p1, for example, 1.0, is assigned to the second evaluation value P2x. Otherwise, a second value p2 is assigned to the second evaluation value P2x, which second value p2 preferably is representative of a reciprocal value of the route count Ny. The second value p2 is, for example, a result of the following equation $$P2x=p2=NTH/Ny.$$

The second evaluation value P2x determined for the respective route cluster is preferably assigned to each route of this route cluster.

The first route time indication V1x is determined relative to the first time unit, for example, minutes, as a function of the point in time Tx. Thus, the first route time indication V1x represents, for example, that minute of a day, in which the driving through the first route section of the corresponding route took place. The second route time indication V2x is determined relative to the second time unit, for example, the day, also as a function of the route point in time Tx. Thus, the second route time indication V2x represents, for example, that day of the week, in which the driving through the first route section of the corresponding route took place. As a function of the first and second route time indication V1x, V2x, the third evaluation value P3x is determined. In this case, first the most recent route is determined for each route cluster, whose route point in time represents most recent point in time. If the route cluster comprises additional routes, a normal distribution, such as a Gaussian distribution, is determined for each additional route.

Figure 4:
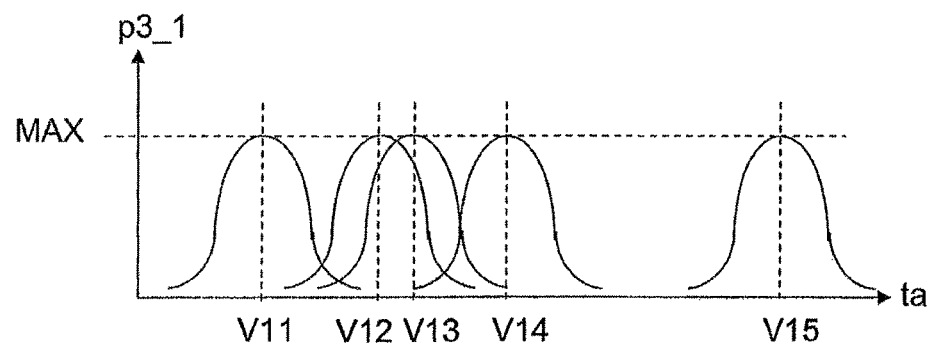

FIG. 4 shows normal distributions of, for example, five routes, which are assigned to a route cluster. The maximum of the respective first normal distribution is assigned to the respective first route time indication V11-V15. The first route time indication of the most recent route is compared with the first route time indications V11-V15 of the additional routes of this route cluster. If a first route time indication V11-V15 of an additional route corresponds precisely to that of the most recent route, a first coincidence value p3_1, such as 1.0, representing a maximal value MAX, will result from the assigned normal distribution of the additional route. If the first route indication V1x of the most recent route does not precisely correspond to that of an additional route of the route cluster, by means of the assigned normal distribution, a first coincidence value p3_1 is obtained that is lower than the maximal value MAX. A second coincidence value p3_2 is, preferably when the second route time indication V2x of the respective additional route corresponds to the second route time indication V2x of the most recent route, a first preset assignment value, such as 1.0, is assigned to the second coincidence value. If, for example, the day of the week is determined as the second route time indication V2x for the respective route, in the case of a corresponding day of the respective additional route and the most recent route, the first preset assignment value can be assigned. The first preset assignment value preferably is a maximal value of the second assignment values. If the second route time indication V2x of the respective additional route corresponds to the second route time indication V2x of the most recent route in a preset category, as, for example, a weekday, a weekend day, a holiday, a second preset assignment value, such as 0.5, is assigned to the second coincidence value. Otherwise, a third preset assignment value, such as 0.1, is assigned to the second coincidence value p3_2. The third preset assignment value may, for example, be a minimal value of the second assignment values. As a function of the first and second coincidence value p3_1, p3_2, the third evaluation value P3x is then determined for the respective route x. The third evaluation value P3x is preferably obtained from the equation $$P3x=1-(p3\_1*p3\_2).$$

The third evaluation value P3x will preferably be determined only if a new route of the respective route cluster was added to which no third evaluation value P3x has yet been assigned. Only in the case of a new route of the respective route cluster, which preferably represents the most recent route, the third evaluation values of the additional routes will change, as required.

Figure 5:
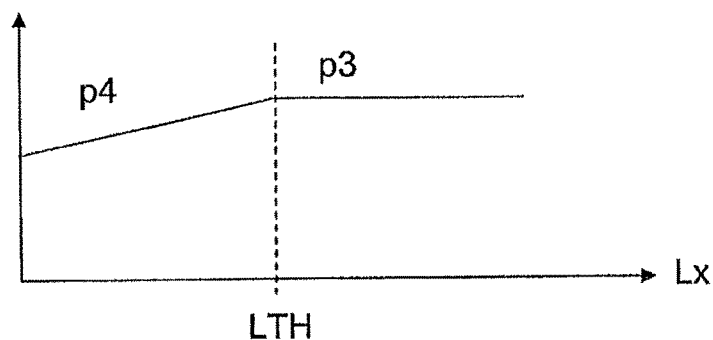

In addition, a route length Lx of the respective route x of the preset selection can be determined in Step S2. As a function of the route length Lx, a fourth evaluation value P4x is determined for the respective route x (FIG. 5). For this purpose, the respective route length Lx is preferably compared with a preset route length threshold value LTH, such as 20 km. If the route length Lx exceeds the route length threshold value LTH, a preset third value p3, such as 1.0, is assigned to the fourth evaluation value P4x. Otherwise, a fourth value p4 is assigned to the fourth evaluation value P4x, which fourth value p4 is determined as a function of the route length Lx. A determination of the fourth value p4 preferably takes place such that a diminishing fourth value is obtained from a decreasing route length Lx starting from the route length threshold value LTH. This can, for example, take place by means of a preset linear equation.

In a Step S4 (FIG. 1), the route evaluation PRx for the respective route x is determined as a function of the first, second and third evaluation value P1c, P2x, P3x. In addition, the fourth evaluation value P4x can be taken into account for the route evaluation PRx. The respective route evaluation PRx is preferably determined as a product of the evaluation values to be taken into account. Subsequently, the determined route evaluation is assigned to the respective route x of the preset selection.

Steps S2 to S4 are preferably executed in a first preset operation OP1 of the route acquisition system; thus, for example, in a normal operation. It is therefore checked in a Step 6 whether the first operation OP1 of the route acquisition system is still on. If that is so, the execution of the program can be implemented again in Step S2. If the condition of Step 6 has not been met, a second preset operation OP2 of the route acquisition system is taking place; thus, for example, a shutting down of the route acquisition system. This can be checked in an additional step. If the route acquisition system is working in the second operation OP2, a size S of an occupied storage space of the data memory is determined in a Step S8. The size S preferably represents an occupancy level of the data memory. In a Step S10, it is checked whether the size S exceeds a first preset occupancy level threshold value STH1, such as 35%. If the condition in Step S10 has not been met, the program is terminated in a Step S20. If the condition of Step S10 has been met, it is checked in a Step 12 whether the size S is smaller than a second preset occupancy level threshold value STH2, such as 95%. If this condition has been met, in a Step S14, all routes of the preset selection are deleted, which are identified by means of their route evaluation PRx as being deletable. For this purpose, the route evaluation PRx of each route x of the preset selection is preferably compared with a preset evaluation threshold value, and, as a function thereof, the respective route x of the preset selection is deleted.

If the condition of Step S12 has not been met, one or a preset number of routes x is deleted first in a Step S16 as a function of their route evaluation PRx. Subsequently, the occupancy level of the data memory is determined in a Step S18, and the resulting size S is compared with a third preset occupancy level threshold value STH3, such as 70%. If the size S continues to exceed the third occupancy level threshold value STH3, Step S16 will be carried out again. If the condition in Step S18 has not been met, the program will be terminated in Step S20. Subsequently, the route acquisition can preferably be switched off.

Figure 6:
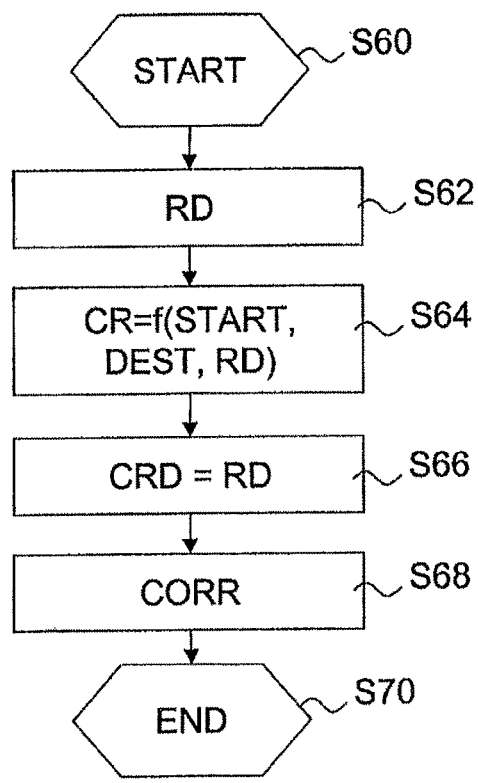
FIG. 6 is an additional flow chart executable by a program in a route acquisition system.

FIG. 6 illustrates an additional flow chart, which is preferably executed as a further program by means of an implementation unit in a route acquisition system. The further program can be called a process for operating a route acquisition system and is preferably stored in a memory of the route acquisition system. The route acquisition system is included, for example, in a navigation system of a motor vehicle and has a route acquisition unit, such as a GPS unit, and a data memory. By means of the route acquisition unit, route data RD of the navigation system can be determined starting from a preset starting position START along a driven route of the motor vehicle. The electronic route is preferably represented by several mutually linked segments or links and is stored in this form in the data memory. In this case, a segment or link represents a route section which differs at least with respect to one preset characteristic from the characteristics of a preceding or following route section; for example, with respect to an obligatory speed, a direction, a road category, such as a federal highway or expressway, etc. The segments of an electronic route are preferably represented by the route data RD of the electronic route. These route data RD can then be stored in the form of an electronic route, which represents the driven route of the motor vehicle, in the data memory of the route acquisition system.

The further program is preferably executed after a reaching of a preset destination position DEST and before a shutting-down of the route acquisition system. In this case, the electronic route stored in the data memory corresponds to the driven route.

The further program is started in a Step S60. In a Step S62, the route data RD are determined which are assigned to the electronic route.

During an average drive by means of a motor vehicle, it may occasionally happen that incorrect route data RD are determined and are assigned to the driven route. Such incorrect assignments may occur mainly at intersections, underpasses or overpasses, expressway off-ramps, etc., which incorrect assignments will then be stored in the data memory as a faulty electronic route. However, in many cases, the drive is not over after the desired destination has been reached. It may be followed by an often tedious search for a parking space. Specifically in destination areas, this may involve driving around a city block several times. Such a search for a parking space at the destination may possibly result in a large number of unnecessary route data which are assigned to the electronic route and are stored in the data memory. In rare cases, there is the possibility that route data are not determined and a segment of the electronic route will therefore be missing.

As a function of the preset starting (START) and destination (DEST) position and the determined route data RD, a comparison route CR is determined in Step S64. The comparison route CR is determined by means of the preset navigation data which are preferably stored in the data memory of the route acquisition system. In this case, the determined route data RD are taken into account in order to determine a corresponding comparison route CR which corresponds to the route stored in the data memory.

In a Step S66, comparison route data CRD of the comparison route CR are determined and compared with the determined route data RD. The comparison route data CRD preferably also represent segments or links. In a Step S68, one or more determined route data RD are then corrected CORR as a function of the comparison.

In this case, the comparison in Step S66 can be implemented such that it is determined whether corresponding route comparison data CRD exist for the determined route data RD. As a function of an absence of corresponding comparison route data CRD, in Step S68, preferably the corresponding route data RD are deleted from the data memory.

Furthermore, it can be determined during the comparison in Step S66, whether corresponding route data RD are present for the comparison route data CRD. As a function of an absence of corresponding route data RD, in Step S68, the corresponding comparison route data CRD are then preferably added to the electronic route. If, for example, one route point in time is assigned to each segment of the electronic route, which route point in time is representative of a point in time at which the drive took place through a route section corresponding to this segment, in addition to the adding of comparison route data CRD in Step S68, an interpolated route point in time can be assigned to these added comparison route data CRD, which interpolated route point in time is determined as a function of stored route points in time.

| Table of Reference Symbols | |
|---|---|
| CR | Comparison route |
| CRD | Comparison route data |
| DES | Destination position |
| LTH | Route length threshold value |
| Lx | Route length |
| NTH | Route count threshold value |
| Ny | Route count |
| OP1 | First operation of the route acquisition system |
| OP2 | Second operation of the route acquisition system |
| pl__1-pl__5 | Range assignment values |
| p3__1, p3__2 | Coincidence values |
| p1-p4 | Values |
| P1x | First evaluation value |

-continued

Table of Reference Symbols

| | |
|---|---|
| P2x | Second evaluation value |
| P3x | Third evaluation value |
| P4x | Fourth evaluation value |
| PRx | Route evaluation |
| RD | Route data |
| S | Size of the occupied data memory |
| START | Start position |
| T_1-T_5 | Time range |
| TH1 | First occupancy level threshold value |
| TH2 | Second occupancy level threshold value |
| TH3 | Third occupancy level threshold value |
| Tx | Route point in time |
| V1x | First route time indication |
| V2x | Second route time indication |
| x | Route of the preset selection |
| y | Route clusters |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for operating a route acquisition system via an implementation unit, the route acquisition system having a route acquisition unit, the implementation unit and a data memory operably configured for determining route data during a movement of the route acquisition system along preset routes and for storing the preset routes in the form of electronic routes in a data memory, the process comprising the following acts implemented by the implementation unit:

during a preset first operation of the route acquisition system, as a function of the electronic routes stored in the data memory, a preset selection of routes is determined;

for each route of the preset selection, a number of essentially coinciding routes of the preset selection and a route point in time, which is representative of a point in time at which the route acquisition system was moved along the preset route, and a first route time indication relative to a first time unit as a function of the route point in time, and a second route time indication relative to a second time unit as a function of the route point in time, are determined;

a route evaluation is determined for each route of the preset selection as a function of the assigned number of routes and the assigned route point in time and the assigned first and second route time indication;

each route of the preset selection is marked with the assigned determined route evaluation;

during a preset second operation of the route acquisition system, a size of an occupied storage space of the data memory is determined; and as a function of the determined size of the occupied storage space, a respective route of the preset selection is deleted from the data memory as a function of its assigned route evaluation.

2. The process according to claim 1, wherein:
the determined size of the occupied storage space is compared with a preset first occupancy level threshold value and with a preset second occupancy level threshold value; and the respective route of the preset selection is deleted as a function of its assigned route evaluation if the determined size of the occupied storage space is larger than the preset first occupancy level threshold value and smaller than the preset second occupancy level threshold value.

3. The process according to claim 2, wherein routes of the preset selection will be deleted as a function of their assigned route evaluation until the size of the occupied storage space reaches or falls below a preset third occupancy level threshold value.

4. The process according to claim 1, wherein, for each route of the preset selection:
a first evaluation value is determined as a function of the assigned route point in time;
a second evaluation value is determined as a function of the assigned route count;
a third evaluation value is determined as a function of the assigned first and second route time indication; and
the route evaluation is determined as a function of the first and second and third evaluation value.

5. The process according to claim 4, wherein, for each route of the preset selection:
the assigned route point in time is compared with several preset time ranges, a preset range assignment value, being assigned to each time range;
it is determined to which preset time range the route point in time is assigned; and
the range assignment value of the determined time range is assigned to the first evaluation value.

6. The process according to claim 4, wherein, for each route of the preset selection:
the assigned route count is compared with a preset route count threshold value;
when there is a falling below the preset route count threshold value, a preset first value is assigned to the second evaluation value;
otherwise, a second value, which is a function of the assigned route count, is assigned to the second evaluation value.

7. The process according to claim 6, wherein the second value is determined as a function of the assigned route count such that the second value is representative of a reciprocal value of the assigned route count.

8. The process according to claim 4, wherein:
from the preset selection of routes, route clusters of essentially coinciding routes are determined;
from a respective route cluster, a most recent route is determined which has the most recent route point in time;
a preset third value is assigned to the third evaluation value of the most recent route of the respective route cluster;
for each additional route of the respective route cluster, the first route time indication of the additional route is compared with the first route time indication of the most recent route, and the second route time indication of the additional route is compared with the second route time indication of the most recent route;
as a function of the comparison, a degree of a time-related coincidence relative to the first and second route indication between the most recent route and the additional route is determined; and
as a function of the determined degree of the time-related coincidence, the third evaluation value is determined and is assigned to the additional route.

9. The process according to claim 8, wherein:
a first coincidence value is determined as a function of a preset normal distribution relative to the first route time indication of a respective additional route; and as a function of the first coincidence value, the time-related coincidence for the respective additional route of the respective route cluster is determined.

10. The process according to claim 9, wherein:
a second coincidence value is determined such that:
in the case of a coincidence of the second route time indication of the additional route with the second route time indication of the most recent route, a first preset assignment value is assigned to the second coincidence value;
in the case of a coincidence in a preset category of the second route time indication of the respective additional route and the second route time indication of the most recent route, a second preset assignment value is assigned to the second coincidence value;
otherwise, a third preset assignment value is assigned to the second coincidence value; and
as a function of the second coincidence value, the time-related coincidence for the respective additional route of the respective route cluster is determined.

11. The process according to claim 1, wherein, during the preset first operation of the route acquisition system, for each route of the preset selection, a route length is determined, and as a function of the determined route length, the route evaluation is determined.

12. The process according to claim 11, wherein, for each route of the preset selection:
a fourth evaluation value is determined as a function of the assigned route length; and
the route evaluation is determined as a function of the fourth evaluation value.

13. The process according to claim 12, wherein, for each route of the preset selection:
the determined route length is compared with a preset route length threshold value; and
when the route length threshold value is exceeded, a preset fourth value is assigned to the fourth evaluation value, otherwise, the fourth evaluation value is determined as a function of the route length and of a preset assignment, the assignment taking place such that, from a diminishing route length, a decreasing fourth evaluation value is obtained.

14. A route acquisition system, comprising:
a route acquisition unit;
a data memory, the route acquisition unit and data memory being operably configured for determining route data during a movement of the route acquisition system along preset routes and for storing the preset routes in the form of electronic routes in the data memory; and
an implementation unit operably configured for:
during a preset first operation, as a function of the electronic routes stored in the data memory, determining a preset selection of routes;
determining, for each route of the preset selection, a number of essentially coinciding routes of the preset selection and a route point in time, which is representative of a point in time at which the route acquisition system was moved along the preset route, and a first route time indication relative to a first time unit as a function of the route point in time, and a second route time indication relative to a second time unit as a function of the route point in time;
determining a route evaluation for each route of the preset selection as a function of the assigned route count and the assigned route point in time and the assigned first and second route time indication;
marking each route of the preset selection with the assigned determined route evaluation; and
during a preset second operation, determining a size of an occupied storage space of the data memory, and as a function of the determined size of the occupied storage space, deleting a respective route of the preset selection from the data memory as a function of its assigned route evaluation.

* * * * *